(12) United States Patent
Serrano et al.

(10) Patent No.: US 8,809,705 B2
(45) Date of Patent: Aug. 19, 2014

(54) DEVICE AND METHOD FOR SWITCHING ELECTRICAL ENERGY

(75) Inventors: Mark Anthony Serrano, Chicago, IL (US); Pandu Maddherla, Andhra Pradesh (IN); Sudarshan Allada, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 989 days.

(21) Appl. No.: 11/949,826

(22) Filed: Dec. 4, 2007

(65) Prior Publication Data

US 2009/0139843 A1    Jun. 4, 2009

(51) Int. Cl.
    *H01H 9/20*    (2006.01)
(52) U.S. Cl.
    USPC ........................ 200/50.21; 361/617
(58) Field of Classification Search
    USPC .................. 200/18, 50.08, 50.21–50.29; 361/605–610, 617, 634, 652
    See application file for complete search history.

(56) References Cited

U.S. PATENT DOCUMENTS

| | | | |
|---|---|---|---|
| 4,423,336 A | 12/1983 | Iverson et al. | |
| 4,540,859 A | 9/1985 | Lemmer | |
| 4,649,244 A | 3/1987 | Baginski et al. | |
| 4,713,501 A * | 12/1987 | Herrmann | 200/50.22 |
| 4,760,278 A | 7/1988 | Thomson | |
| 4,773,870 A | 9/1988 | Sinnig | |
| 4,804,933 A | 2/1989 | Becker et al. | |
| 4,999,598 A | 3/1991 | Jannesari et al. | |
| 5,023,469 A | 6/1991 | Bassett et al. | |
| 5,200,568 A | 4/1993 | Fukushima et al. | |
| 5,343,355 A | 8/1994 | Ishikawa | |
| 5,397,868 A | 3/1995 | Smith et al. | |
| 5,459,293 A * | 10/1995 | Hodkin et al. | 200/50.26 |
| 5,486,978 A | 1/1996 | Fishovitz | |
| 5,638,948 A | 6/1997 | Sharaf et al. | |
| 5,646,459 A | 7/1997 | Hatate et al. | |
| 5,652,416 A | 7/1997 | Sharaf et al. | |
| 5,721,449 A | 2/1998 | Panuce | |
| 5,914,467 A | 6/1999 | Jonas et al. | |

(Continued)

FOREIGN PATENT DOCUMENTS

| | | |
|---|---|---|
| CA | 2129177AA | 1/1996 |
| CA | 2255283AA | 6/2000 |

(Continued)

OTHER PUBLICATIONS

Translation of Chinese Office Action issued in connection with Chinese Patent Application No. 200880119962.1 filed Oct. 21, 2008.
PCT Search Report issued in connection with corresponding WO Patent Application No. US2008/080577 dated on May 3, 2009.

*Primary Examiner* — Amy Cohen Johnson
*Assistant Examiner* — Marina Fishman
(74) *Attorney, Agent, or Firm* — GE Global Patent Operation; Catherine J. Toppin

(57) ABSTRACT

A shutter device is provided for a bypass isolation automatic transfer switch. The shutter device comprises a frame and a shutter that is movably supported by the frame and that is configured to selectively cover and uncover conductors. At least one cam is movably supported by the frame and at least one shutter lever is interposed between the shutter and the at least one cam. The shutter lever is configured to move the shutter in response to movement of the cam.

18 Claims, 13 Drawing Sheets

(56) References Cited

U.S. PATENT DOCUMENTS

| | | |
|---|---|---|
| 6,031,191 A | 2/2000 | Ahlert et al. |
| 6,066,821 A | 5/2000 | Wehrli, III et al. |
| 6,072,136 A | 6/2000 | Wehrli, III et al. |
| 6,080,947 A | 6/2000 | Ulerich et al. |
| 6,100,604 A | 8/2000 | Morroni et al. |
| 6,650,211 B2 | 11/2003 | Pimouguet |
| 6,693,248 B1 | 2/2004 | Schultz |
| 6,815,622 B2 | 11/2004 | Milman et al. |
| 6,876,103 B2 | 4/2005 | Radusewicz et al. |
| 7,440,259 B1 * | 10/2008 | Deylitz et al. ............... 361/617 |
| 2004/0179318 A1 | 9/2004 | Hashimoto et al. |
| 2008/0035456 A1 | 2/2008 | Melchionne, Jr. |

FOREIGN PATENT DOCUMENTS

| | | |
|---|---|---|
| CN | 2170576 Y | 6/1994 |
| CN | 2236684 Y | 10/1996 |
| EP | 0224703 A | 6/1987 |
| JP | 5159677 A2 | 6/1993 |
| JP | 2002335610 A | 11/2002 |
| KR | 186075 Y1 | 6/2000 |
| KR | 273508 B1 | 12/2000 |
| KR | 273509 B1 | 12/2000 |
| KR | 1068607 A | 7/2001 |
| WO | 03023799 A2 | 3/2003 |

* cited by examiner

DEVICE AND METHOD FOR SWITCHING ELECTRICAL ENERGY

BACKGROUND OF THE INVENTION

1. Field of the Invention

The subject matter described herein relates generally to switches and, more particularly, to switches for sourcing electrical energy.

2. Related Art

Electrical switches for switching a source of electrical energy are known. For example, automatic transfer switches function to switch a main source of power that is reduced or cut off to another source of power. One particular automatic transfer switch is a bypass isolation automatic transfer switch that has an additional feature for preventing non-main source energy from leaking back into the main source.

Starting in the mid 1980s and onward, bypass isolation automatic transfer switches have been widely used in the power industry. As the need for critical power installations continues to grow and as power sensitive equipment continues to be developed and installed in locations throughout the U.S. and the world, it continues to become more apparent how important power dependency has become. Current bypass isolation automatic transfer switches have a "top-down" structure that includes an isolation panel affixed to a frame and disposed above an automatic transfer switch. Connection between the isolation panel and the automatic transfer switch is accomplished through movement of the two in a vertical direction.

Though highly effective for the given cost, bypass isolation automatic transfer switches have a disadvantage in that the "top-down" structure leads to an enhanced equipment footprint that, in turn, keeps it from being a more popular choice in the market. With the upgrade of power to existing installations, these large bypass units are sometimes too big to fit through existing doorways thus forcing contractors to perform demolition and repair activities on doorways and entry halls.

Accordingly, to date, no suitable switch is available which overcomes the above and other disadvantages of the prior art.

BRIEF DESCRIPTION OF THE INVENTION

In accordance with an embodiment of the present invention, a shutter device is provided for a bypass isolation automatic transfer switch. The shutter device comprises a frame, a shutter that is movably supported by the frame and that is configured to selectively cover and uncover conductors. At least one cam is movably supported by the frame and at least one shutter lever is interposed between the shutter and the at least one cam. The shutter lever is configured to move the shutter in response to movement of the cam.

In another aspect of the present invention, a method of connecting an automatic transfer switch to a shuttered bypass panel comprises providing a movable automatic transfer switch; fixing a bypass panel to a frame; shuttering receptacles of the bypass panel in response to movement of the automatic transfer switch; and moving the automatic transfer switch to connect the automatic transfer switch to the bypass panel.

In a further aspect of the invention, a bypass isolation automatic transfer switch comprises a frame, a bypass panel supported by the frame, a movable automatic transfer switch and a shutter device supported by the frame. The shutter device comprises a frame, a shutter that is movably supported by the frame and that is configured to selectively cover and uncover conductors. At least one cam is movably supported by the frame and at least one shutter lever is interposed between the shutter and the at least one cam. The shutter lever is configured to move the shutter in response to movement of the cam.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a switch that includes dimensions of both reduced height and depth thus yielding a smaller more compact package for easier installation and use while also providing an enhanced safety feature for the switch. In one particular embodiment, a shutter is provided for covering bus bars of an isolation panel when not connected to bus bars of an automatic transfer switch.

Figure 1:
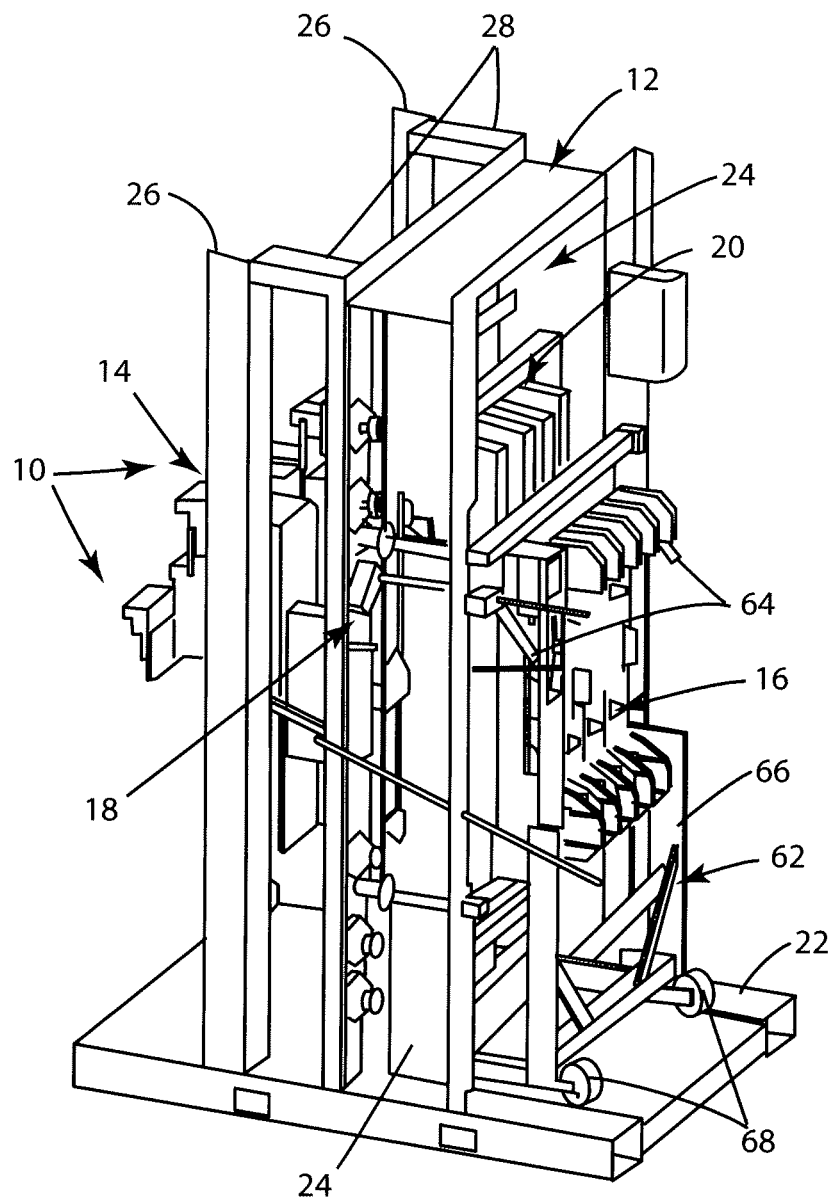
FIG. 1 is a perspective view of a switch comprising a frame, an isolation panel and an automatic transfer switch in accordance with one embodiment of the present invention.

Referring now to FIG. 1, a switch in accordance with one embodiment of the present invention is illustrated generally at 10. In this embodiment, the switch 10 comprises a frame 12, a bypass panel 14, a movable automatic transfer switch 16, a racking mechanism 18 for moving the automatic transfer switch 16 into contact with the bypass panel 14 and a shutter mechanism 20.

The frame 12 may comprise any suitably strong and durable sheet material such as a steel or aluminum and may comprise a base 22, two pairs of upright portions 24 and 26 extending from the base and stabilizing members 28 and 30 interconnected with the upright portions. As shown, each of the base 22, upright portions 24 and 26 and stabilizing members 28 may comprise appropriate cross-sectional configurations for enhanced strength to support, e.g., the bypass panel 14, the racking mechanism 18, and the shutter mechanism 20.

Figure 2:
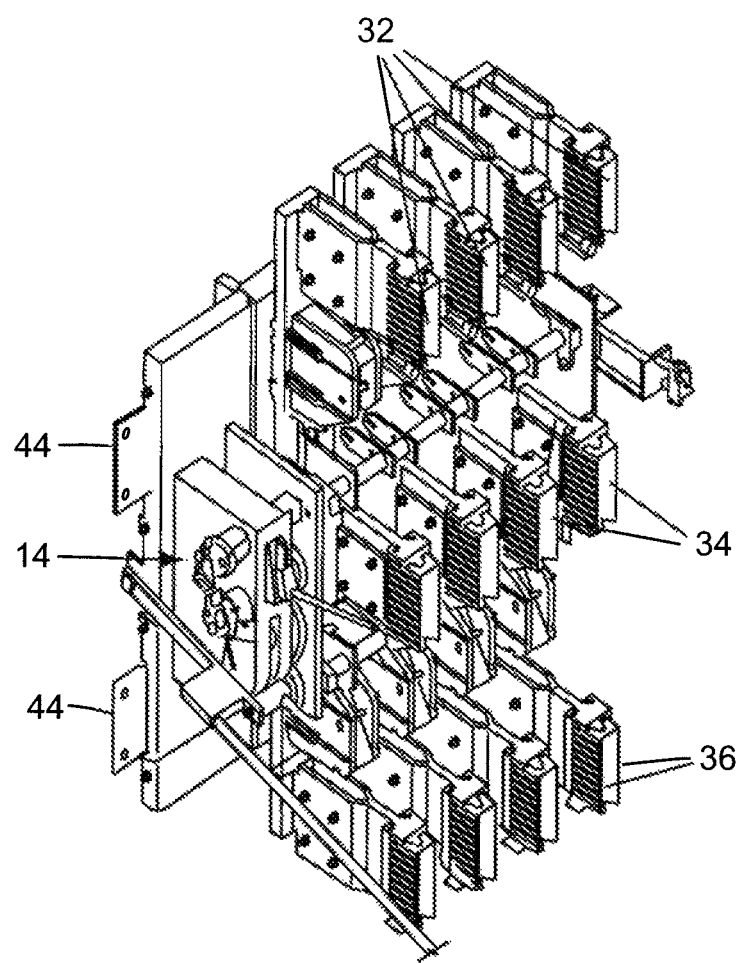
FIG. 2 is an enlarged, perspective view showing one side of the isolation panel of FIG. 1.
Figure 3:
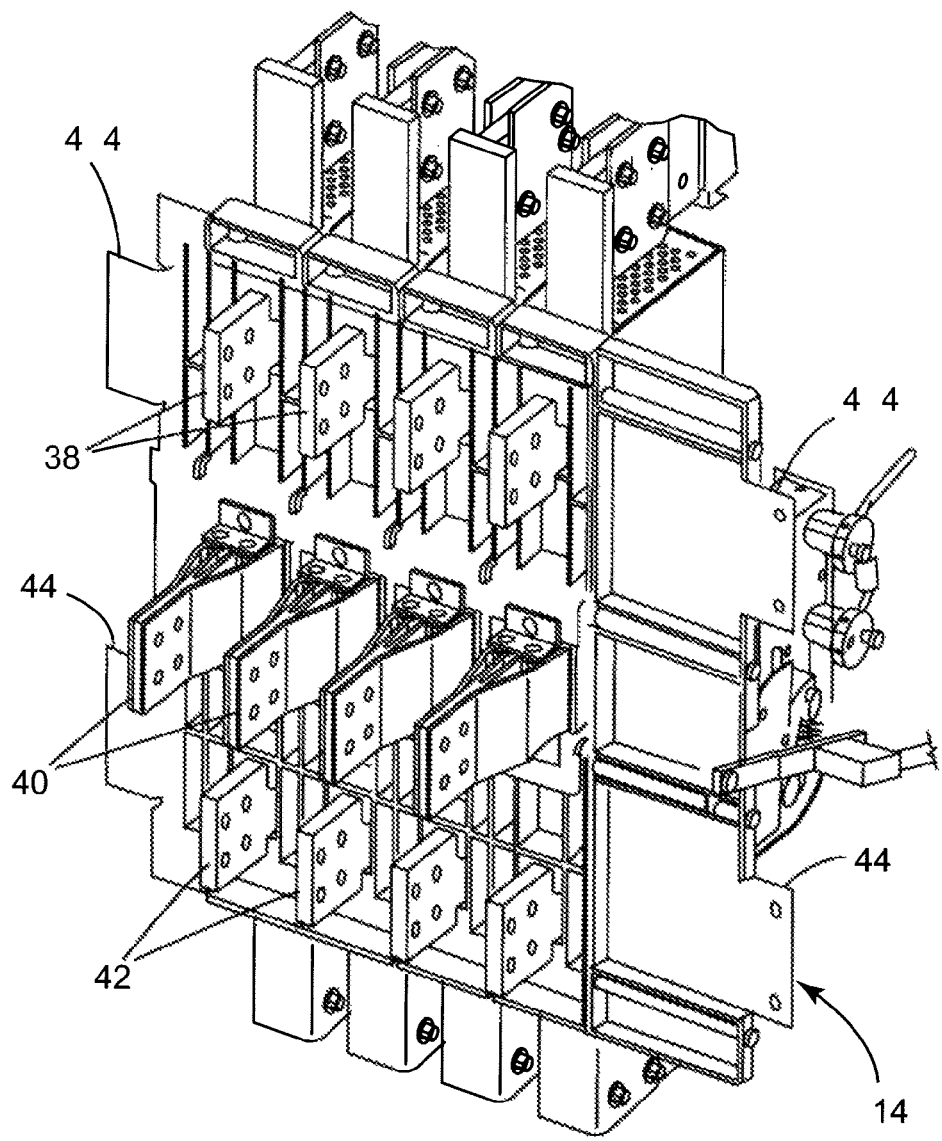
FIG. 3 is another enlarged, perspective view showing another side of the isolation panel of FIG. 1.
Figure 5:
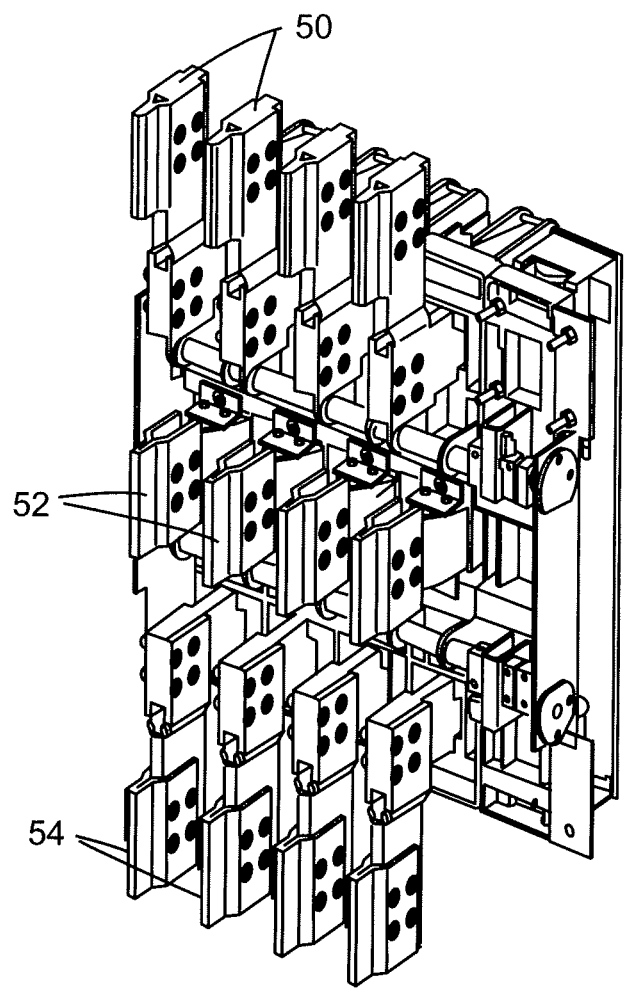
FIG. 5 is another enlarged, perspective view showing another side of the automatic transfer switch of FIG. 1.

Referring now to FIGS. 2 and 3, and 5, the bypass panel 14 comprises baskets or receptacles 32, 34 and 36 that are connectable with blade connectors 50, 52, and 54 (FIG. 5) and are in an exemplary four-pole configuration. In the shown configuration, bus bars 38 and 42 provide power while bus bar 40 provides line return via receptacles 32, 34, and 36 when connected. Mounting plates 44 function to support the bypass panel 14 when fastened to the frame 12.

Figure 4:
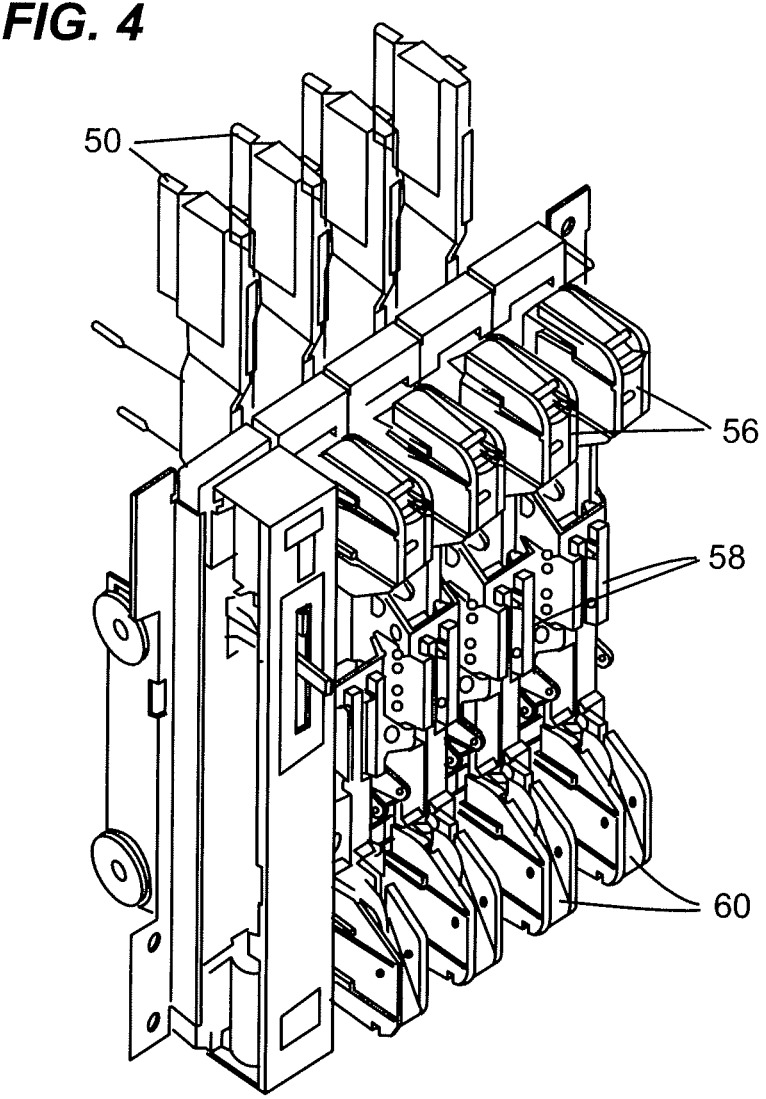
FIG. 4 is an enlarged, perspective view showing one side of the automatic transfer switch of FIG. 1.

The automatic transfer switch 16 is best seen in FIGS. 4 and 5 and comprises blade connectors 50, 52 and 54. The blade connectors 50, 52 and 54 are arranged to mate with the receptacles 32, 34 and 36 of the bypass panel 14 (FIG. 2) when not covered by the shutter mechanism 20 (FIG. 1) as described in more detail below.

Referring again to FIG. 1, the automatic transfer switch 16 is mounted to, and supported by, a movable cart 62 that includes handles 64, support structure 66 and wheels 68. The handles 64 are provided so that an operator may move the automatic transfer switch 16, where necessary.

The racking mechanism 18 is provided for moving the cart 62 and, in turn, the automatic transfer switch 16, e.g., for a scheduled maintenance. Upon completion of maintenance, the blade connectors 50, 52 and 54 of the automatic transfer switch may be urged together with the receptacles 32, 34 and 36 by the racking mechanism 18.

Figure 6:
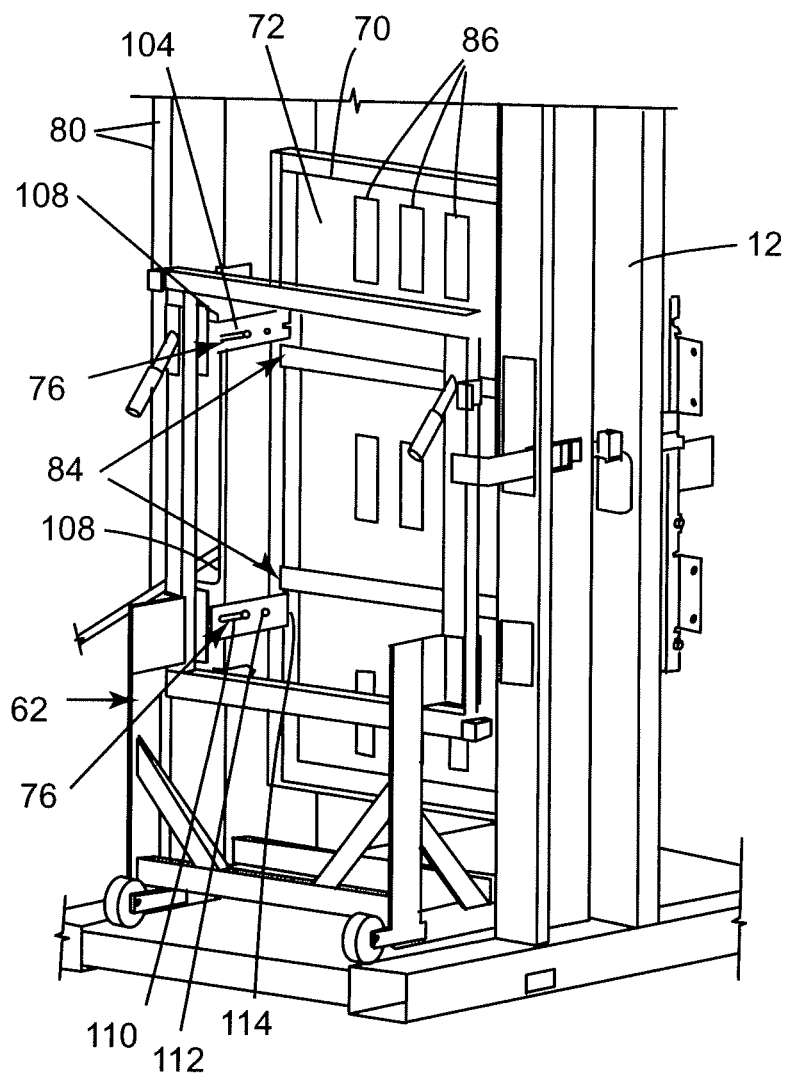
FIG. 6 is a perspective view of a portion of the switch of FIG. 1 showing a shutter shield and a cart for supporting the automatic transfer switch which is omitted.
Figure 7:
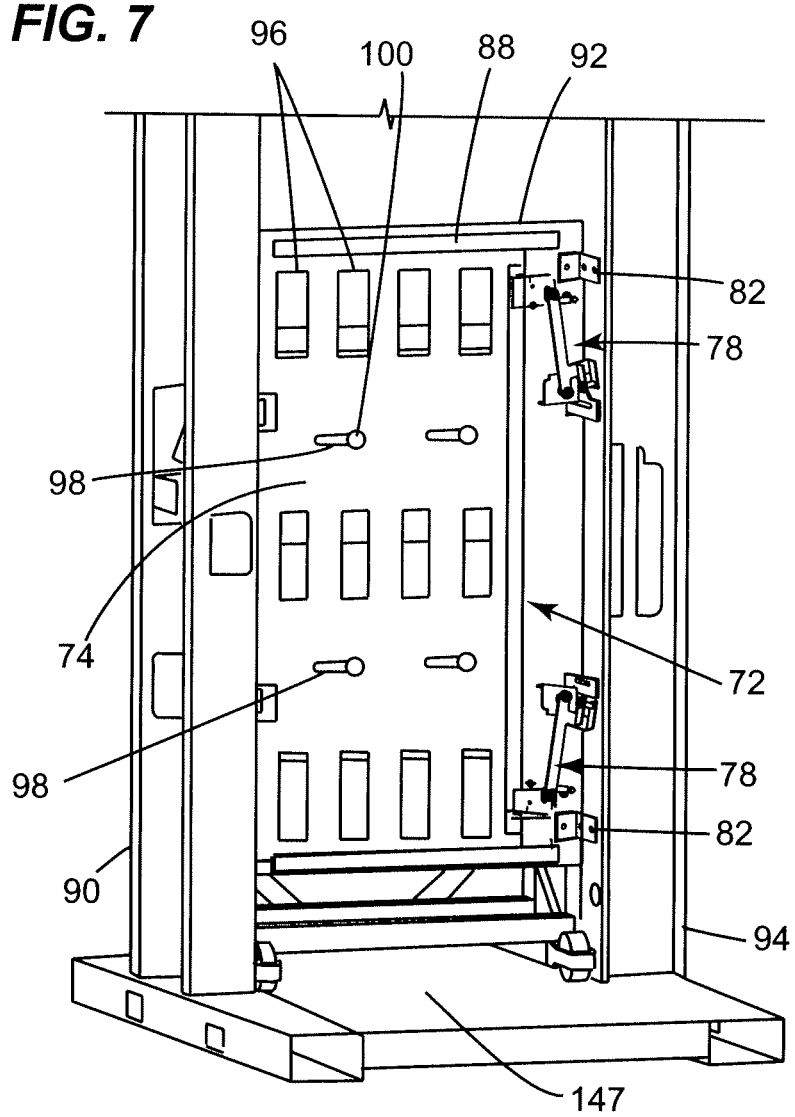
FIG. 7 is another perspective view of a portion of the switch of FIG. 1 showing a shutter, a shutter lever and a pusher cam in an open position.

Referring now to FIGS. 6 and 7, the shutter mechanism 20 may be connected to the frame 12 and comprises a mounting frame 70, a shutter shield 72, a shutter 74, pusher cams 76 and shutter levers 78. The mounting frame 70 comprises any suitably strong and durable material such as a steel and may be connected with the frame 12 via suitable fasteners 80 and mounting brackets 82. Support strips 84 may support a central open portion of the mounting frame 70 as described below.

The shutter shield 72 functions to protect the end user against incidental or accidental contact with live parts or the bus systems 32, 34, and 36 and comprises an insulative material such as a polycarbonate or a compressed and treated fiber board. Apertures 86 extend through the shutter shield 72 at appropriate locations to provide for passage of the blade connectors 50, 52 and 54 for connection with the receptacles 32, 34 and 36. Mounting slides 88 and 90 may extend along and generally parallel to opposing end portions 92 and 94 of one side (not numbered) of the shutter shield 72.

The shutter 74 may comprise a generally thin sheet of insulative material such as a polymeric substance and, as illustrated, is slidably supported by the mounting slides 88 and 90. The shutter 74 may comprise apertures 96 and slots 98. Fasteners 100 may extend through the slots 98 for engagement with the shutter shield 72 and to provide for support and sliding movement of the shutter 74.

Figure 8:
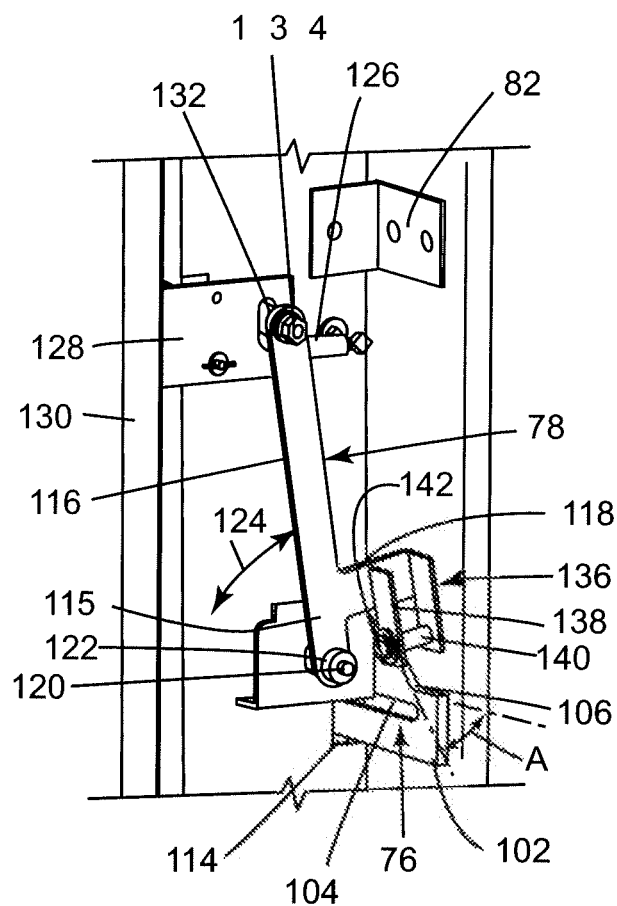
FIG. 8 is an enlarged view, in perspective, of the shutter lever and the pusher cam of FIG. 7.

Referring now also to FIG. 8, in the exemplary embodiment, two pusher cams 76 are illustrated and each may comprise a plate 102 that may comprise mounting slots 104 and a cam surface 106. The plate 102 may comprise any suitably strong material such as a steel and is configured to be engaged by strike plates 108 of the cart 62. Fasteners 110, extend through mounting slots 104, and stops 112 may be provided for closing reciprocal movement of the pusher cams 76. The pusher cams 76 extend through apertures 114 in the mounting frame 70 and the shutter shield 72 with the cam surface 106 disposed adjacent the shutter lever 78.

The cam surface 106 (also seen in FIG. 11) may be angled at an angle A that is acute and, in one optional embodiment, angle A may be in the range of between about 38° degrees to about 42° degrees. In one particular embodiment, angle A is approximately 40°. The cam surface 106 functions to urge the shutter lever 78 upon movement of the pusher cam 76, as described in more detail below.

The shutter levers 78 may be disposed in opposing directions or in a mirrored manner as illustrated and each may comprise a strong metallic substance such as a steel. Each shutter lever 78 is rotatable about a pivot portion 115 and each comprises a lever arm 116 and a roller arm 118.

The pivot portion 115 may be pinned by a fastener 120 and a bearing 122 to provide for rotational movement in the direction of arrow 124. A spring 126 may be provided to bias the shutter lever in one direction that, in turn, biases the shutter 74 in a "closed position". A couple 128 and stiffening member 130 may be interposed between the shutter lever 78 and the shutter 74.

The lever arm 116 may be rotatably connected to the couple 128 via a bearing 132 and a fastener 134.

The roller arm 118 may extend from the lever arm 116 and may comprise a support bracket 136 that, in turn, comprises members 138 and a roller 140. The roller 140 may extend through apertures (not numbered) in the members 138 that support bearings 142. The roller 140 is biased by spring 82 against the cam surface 106.

Figure 9:
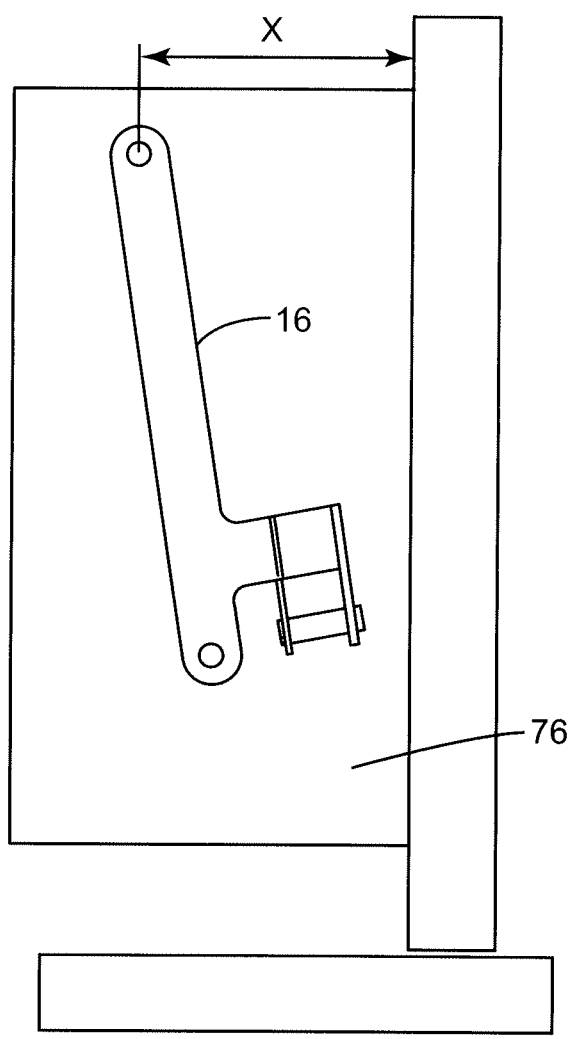
FIG. 9 is a further enlarged view, from a side, of the shutter lever of FIG. 7 in a first position.
Figure 10:
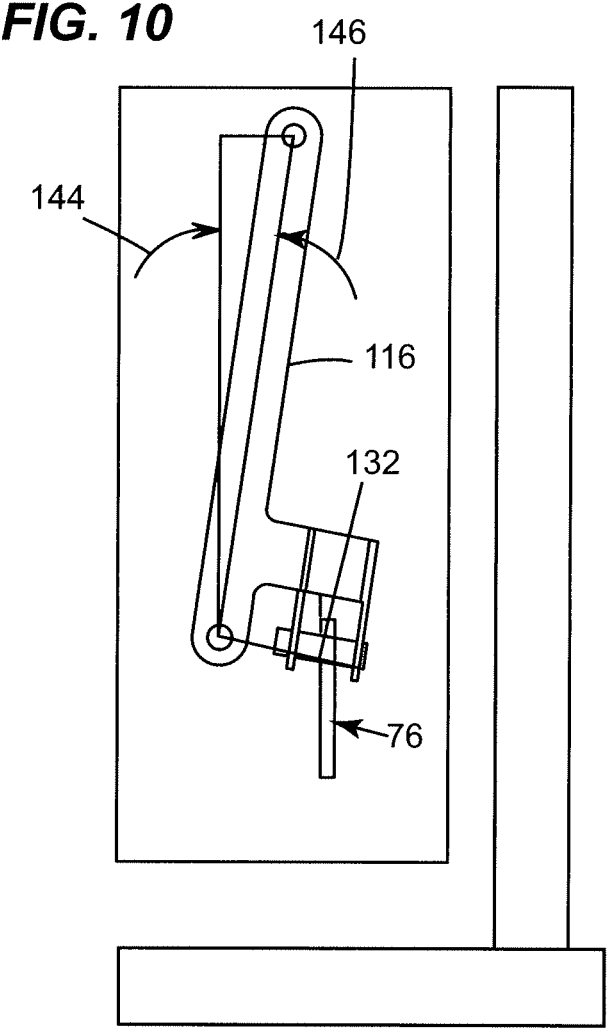
FIG. 10 is another view, similar to that of FIG. 9, with the shutter lever in a second position.
Figure 11:
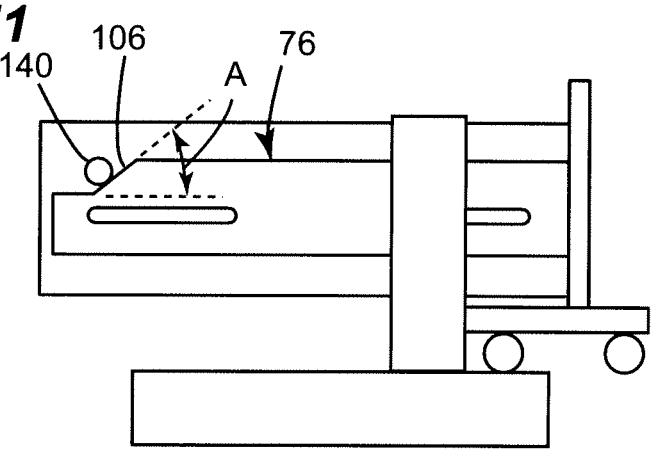
FIG. 11 is a further enlarged view, from a side, of the pusher cam of FIG. 7.

As shown in FIGS. 9 through 11, linear movement of the pusher cam 76 causes movement of the roller 140 along cam surface 106 and, in turn, rotation of the lever arm 116 in the directions of arrows 144 and 146. The rotation of lever arm 116 may be on the order of between approximately −12° in a clockwise direction and approximately +4° in a counterclockwise direction for a total of about 16° of angular rotation. Rotation of the lever arm 116 causes reciprocal movement of the shutter 72 as illustrated by an arrow 147 in FIG. 7.

Figure 12:
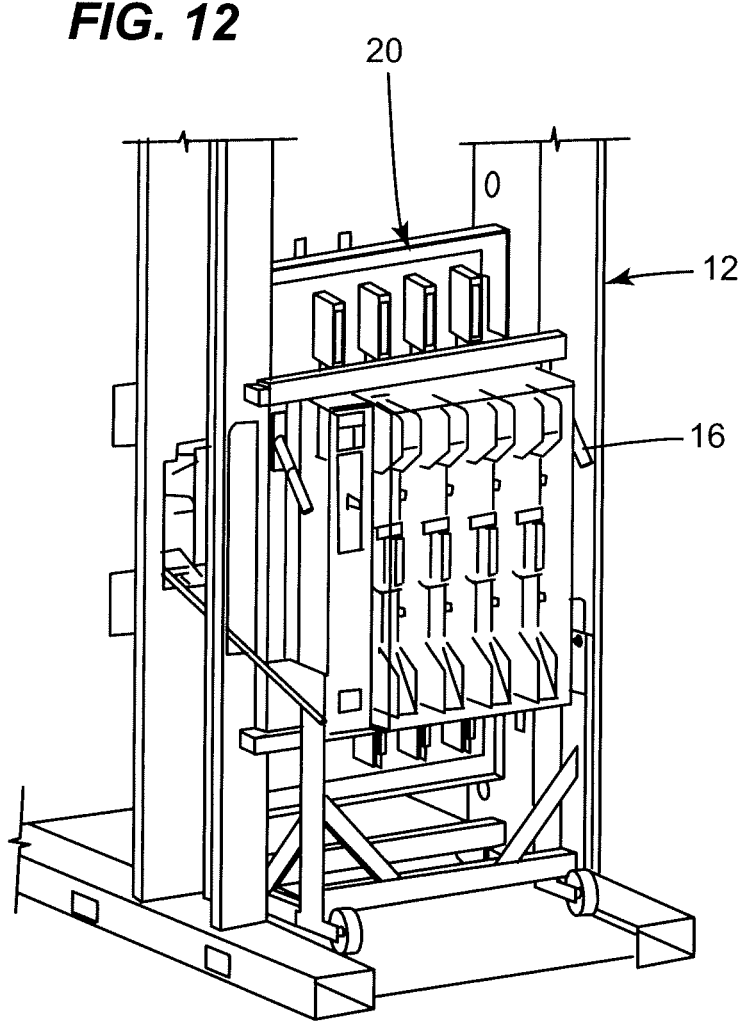
FIG. 12 is another perspective view of the switch of FIG. 1 showing the shutter in the open position.
Figure 13:
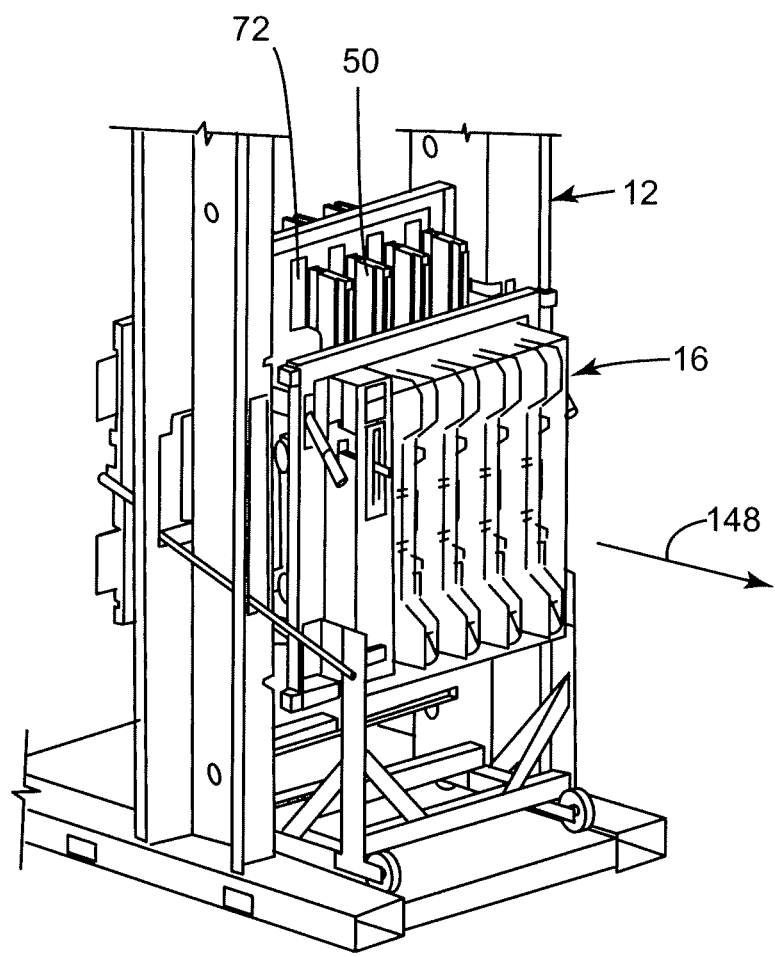
FIG. 13 is a further perspective view of the switch of FIG. 1 showing the shutter in the closed position.

FIGS. 12 and 13 illustrate a racked in position and a racked out position of the automatic transfer switch 16. Upon movement of the automatic transfer switch 16 in the direction of arrow 148, blade connectors 50 will be separated from the receptacles 32 (FIG. 14) and the shutter 72 will close.

Figure 14:
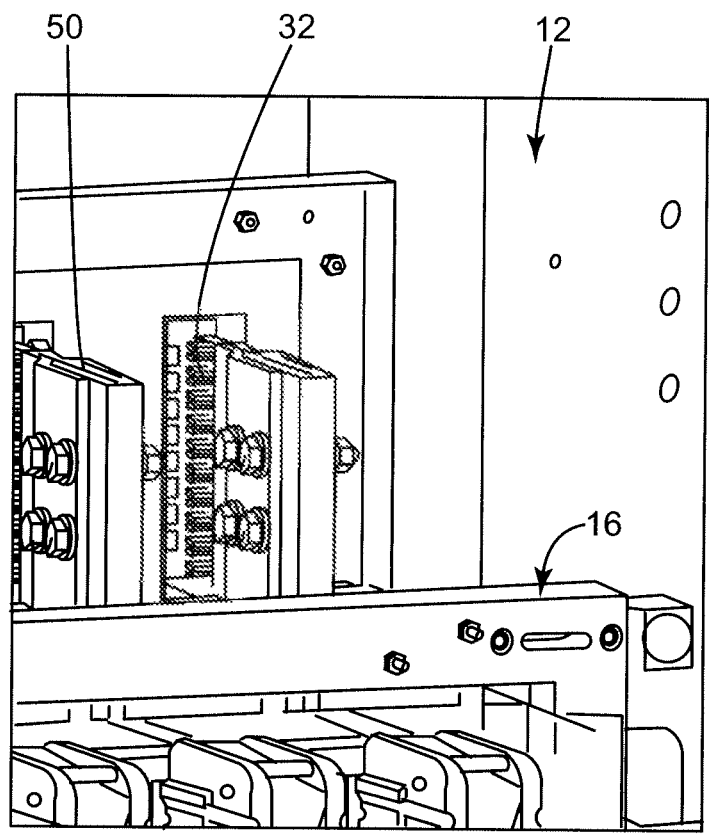
FIG. 14 is an enlarged view of a portion of the switch of FIG. 1 showing automatic transfer switch bus bars adjacent an open window of the shutter.

FIG. 14 illustrates a position of the automatic transfer switch 16 just after the shutter 72 has reciprocated out of the way revealing the receptacles 32.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A shutter device for a bypass isolation automatic transfer switch, comprising:
   a frame;
   a shutter movably supported by the frame and being configured to selectively cover and uncover conductors; and
   at least one shutter lever interposed between the shutter and at least one cam, the shutter lever comprising:
      a pivot portion;
      a lever arm extending from the pivot portion and coupled to the shutter; and
      a roller arm extending from the lever arm, the roller arm further comprising a roller, the roller configured to engage a cam surface of the cam such that linear movement of the cam causes movement of the roller along the cam surface and rotation of the lever arm to pivot about the pivot portion and reciprocably move the shutter side-to-side to selectively cover and uncover the conductors.

2. The device of claim 1,
wherein the cam surface is disposed at an acute angle to a longitudinal axis of the cam.

3. The device of claim 2, wherein the acute angle is within the range of between about 38° to about 42°.

4. The device of claim 3, wherein the acute angle is about 40°.

5. The device of claim 1, wherein the roller arm comprises a support bracket that extends in a direction perpendicular to a longitudinal axis of the roller arm and generally parallel to a longitudinal axis of the lever arm and wherein the support bracket comprises a pair of bearings supporting opposing ends of the roller.

6. The device of claim 1, wherein the lever arm comprises:
a shutter mount portion that is interconnected with the shutter and is biased against movement in one direction;
wherein the roller arm extends from a position interposed between the shutter mount portion and the pivot portion.

7. The device of claim 6, wherein the shutter is mounted to a shutter shield having a plurality of first apertures and wherein the shutter comprises:
a plurality of second apertures that correspond to the first apertures;
a plurality of slots interspersed with the second apertures; and
a plurality of fasteners being dimensioned and configured to be mounted through the slots and to the shutter shield to support the shutter while providing for reciprocal movement of the shutter over a dimension equal to a longitudinal axis of the slots.

8. The device of claim 1, wherein the at least one cam comprises a second cam and the at least one shutter lever comprises a second shutter lever and wherein one of the shutter lever and interconnected cam are opposingly disposed with respect to the other shutter lever and interconnected cam.

9. A method of connecting an automatic transfer switch to a shuttered bypass panel, comprising:
providing a movable automatic transfer switch;
fixing a bypass panel to a frame;
linearly biasing a pusher cam, the cam having a cam surface that engages with a roller and provides for the movement of the roller in a direction that imparts a rotation force to a roller arm, which imparts rotational force to a lever arm, such that the linear movement of the cam causes movement of the roller along the cam surface and rotation of the lever arm to pivot about a pivot portion;
coupling the lever arm to a slidable shutter;
shuttering the slidable shutter side-to-side to uncover receptacles of the bypass panel using the rotation force of the lever arm in response to movement of the automatic transfer switch; and
moving the automatic transfer switch to connect the automatic transfer switch to the bypass panel.

10. The method of claim 9, wherein shuttering receptacles of the bypass panel, comprises:
mounting the slidable shutter to the frame;
extending the pusher cam through apertures in the frame, the pusher cam being slidable; and
connecting at least one shutter lever between the slidable shutter and the pusher cam;
wherein the at least one pusher cam is configured to engage and rotate the at least one shutter lever which, in turn, is configured to slide the shutter side-to-side to selectively cover and uncover the receptacles of the bypass panel.

11. The method of claim 9, wherein moving the automatic transfer switch comprises mounting a racking mechanism to the frame and wherein the racking mechanism is configured to move the switch to connect the automatic transfer switch to the bypass panel.

12. A bypass isolation automatic transfer switch, comprising:
a frame;
a bypass panel supported by the frame;
a movable automatic transfer switch; and
a shutter device supported by the frame, comprising:
a shutter movably supported by the frame and being configured to selectively cover and uncover conductors; and
at least one shutter lever is interposed between the shutter and the at least one cam, the shutter lever comprising:
a pivot portion;
a lever arm extending from the pivot portion and coupled to the shutter; and
a roller arm extending from the lever arm, the roller arm further comprising a roller, the roller configured to engage a cam surface of the cam such that linear movement of the cam causes movement of the roller along the cam surface and rotation of the lever arm to pivot about the pivot portion and reciprocably move the shutter side-to-side to selectively cover and uncover the conductors.

13. The device of claim 12, wherein the at least one cam comprises:
a cam surface disposed at an acute angle to a longitudinal axis of the cam.

14. The device of claim 12, further comprising a racking mechanism mounted to the frame and wherein the racking mechanism is configured to move the switch to connect the automatic transfer switch to the bypass panel.

15. The device of claim 12, wherein the roller arm comprises a support bracket that extends in a direction perpendicular to a longitudinal axis of the roller arm and generally parallel to a longitudinal axis of the lever arm and wherein the support bracket comprises a pair of bearings supporting opposing ends of the roller.

16. The device of claim 12, wherein the lever arm comprises:
a shutter mount portion that is interconnected with the shutter and is biased against movement in one direction;
wherein the roller arm extends from a position interposed between the shutter mount portion and the pivot portion.

17. The device of claim 16, wherein the shutter comprises:
a plurality of apertures;
a plurality of slots interspersed with the apertures; and
a plurality of fasteners being dimensioned and configured to be mounted through the slots and to support the shutter while providing for reciprocal movement of the shutter, a dimension equal to a longitudinal axis of the slots.

18. The device of claim 12, wherein the at least one cam comprises a second cam and the at least one shutter lever comprises a second shutter lever and wherein one of the shutter lever and interconnected cam are opposingly disposed with respect to the other shutter lever and interconnected cam.

\* \* \* \* \*

UNITED STATES PATENT AND TRADEMARK OFFICE
CERTIFICATE OF CORRECTION

| | | |
|---|---|---|
| PATENT NO. | : 8,809,705 B2 | Page 1 of 1 |
| APPLICATION NO. | : 11/949826 | |
| DATED | : August 19, 2014 | |
| INVENTOR(S) | : Serrano et al. | |

It is certified that error appears in the above-identified patent and that said Letters Patent is hereby corrected as shown below:

In the Specification

In Column 4, Line 24, delete "spring 82" and insert -- spring 126 --, therefor.

Signed and Sealed this
Twelfth Day of May, 2015

Michelle K. Lee
*Director of the United States Patent and Trademark Office*